US012570366B2

(12) United States Patent
Cervelli

(10) Patent No.: US 12,570,366 B2
(45) Date of Patent: Mar. 10, 2026

(54) AERODYNAMIC FIN FOR A MOTOR VEHICLE AND PROCESS TO MANUFACTURE THE FIN

(71) Applicant: FERRARI S.P.A., Modena (IT)

(72) Inventor: Daniele Cervelli, Modena (IT)

(73) Assignee: FERRARI S.P.A., Modena (IT)

( * ) Notice: Subject to any disclaimer, the term of this patent is extended or adjusted under 35 U.S.C. 154(b) by 363 days.

(21) Appl. No.: 18/316,174

(22) Filed: May 11, 2023

(65) Prior Publication Data

US 2023/0365203 A1 Nov. 16, 2023

(51) Int. Cl.
| | |
|---|---|
| *B62D 35/00* | (2006.01) |
| *B62D 27/06* | (2006.01) |
| *B62D 29/04* | (2006.01) |
| *B62D 27/02* | (2006.01) |

(52) U.S. Cl.
CPC ......... *B62D 35/007* (2013.01); *B62D 27/065* (2013.01); *B62D 29/043* (2013.01); *B62D 27/026* (2013.01)

(58) Field of Classification Search
CPC .... B62D 35/00; B62D 35/002; B62D 35/005; B62D 35/007; B62D 35/008; B62D 35/02; B62D 37/02; B60J 7/22; B60J 7/223

USPC ........................ 296/217, 180.1, 180.2, 180.4
See application file for complete search history.

(56) References Cited

U.S. PATENT DOCUMENTS 10,589,805 B1 3/2020 Grajek et al.

FOREIGN PATENT DOCUMENTS

| | | | | |
|---|---|---|---|---|
| CN | 111113947 A | * | 5/2020 | ............. B62D 35/00 |
| EP | 3792161 A1 | | 3/2021 | |

OTHER PUBLICATIONS

CN11113946 Text (Year: 2020).*
Italian Search Report for Application No. 102022000009803; Filing Date: May 12, 2022; Date of Mailing—Jan. 9, 2023, 8 pages.

* cited by examiner

*Primary Examiner* — Dennis H Pedder
(74) *Attorney, Agent, or Firm* — CANTOR COLBURN LLP

(57) ABSTRACT

An aerodynamic fin configured to be fixed to an outer panel of a motor vehicle, the fin comprising a core comprising a plastic material and having a first surface to be turned towards the panel so as to fix the fin to the panel, a cover comprising carbon fibre, and fixing means which fix the cover to the core, so that the cover covers the core on the opposite side with respect to the first surface, thereby hiding the core when the fin is fixed to the panel.

19 Claims, 4 Drawing Sheets

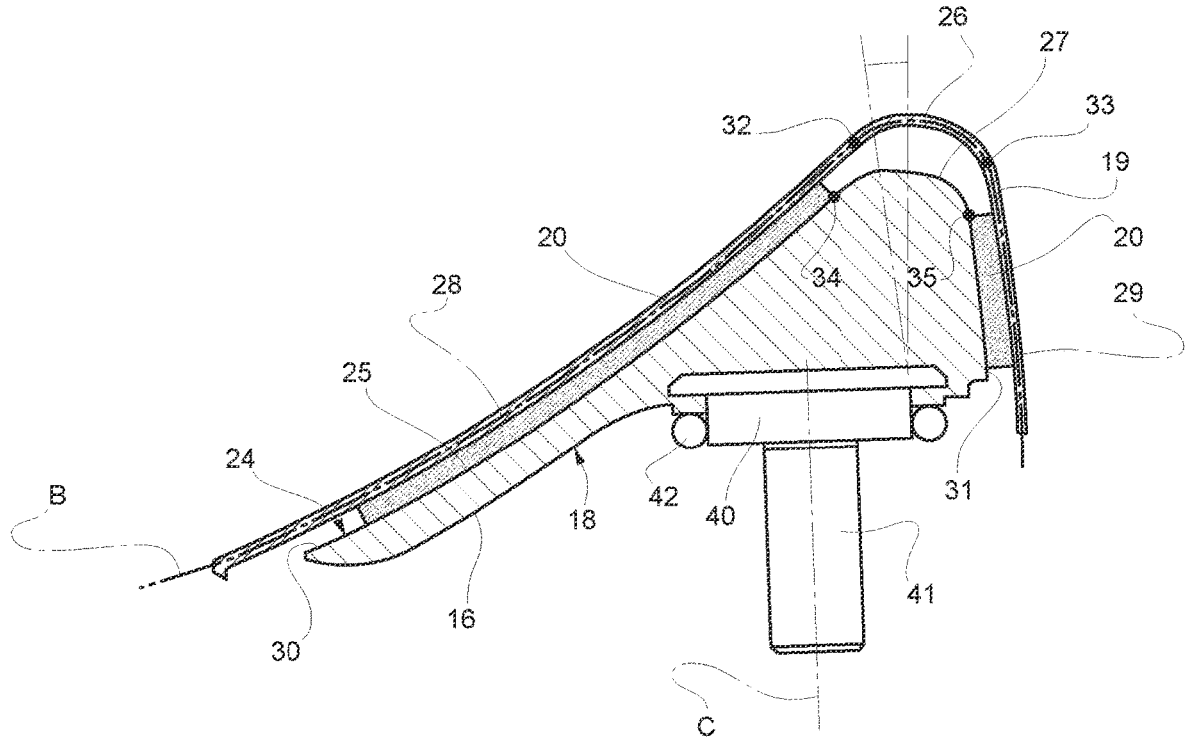

AERODYNAMIC FIN FOR A MOTOR VEHICLE AND PROCESS TO MANUFACTURE THE FIN

CROSS-REFERENCE TO RELATED APPLICATIONS

This patent application claims priority from Italian patent application no. 102022000009803 filed on May 12, 2022, the entire disclosure of which is incorporated herein by reference.

TECHNICAL FIELD

The invention relates to an aerodynamic fin for a motor vehicle, in particular of sports type.

The invention further relates to a process for manufacturing the aerodynamic fin.

PRIOR ART

It is known that some vehicles are provided with small aerodynamic fins integrated into the bodywork and having a function of cooperating with a rear wing, also called spoiler, in order to further increase the downforce produced by the wing alone.

These particular additional fins, distinct and separate from the wings intended to produce most of the downforce, are more precisely known by the term nolder.

In the following description, the term fin will refer in particular only to the term nolder and will therefore have no other meanings, although this is not to be considered as necessarily limiting.

According to the prior art, the fins can also have other arrangements and functions in the motor vehicle.

For example, some convertible motor vehicles have the fins fixed at the side ends of the windscreen with the function of airflow diverters for reducing or eliminating rustling inside the passenger compartment when the roof is open.

In general, motor vehicles equipped with the mentioned fins are often luxury sports motor vehicles.

Therefore, in these cases the fins have to have a high aesthetic value in addition to having to perform their functions effectively.

In particular, in order to satisfy the high aesthetic and functional needs required for a luxury motor vehicle, the fins are made of carbon fibre.

Carbon fibre allows making finishes having high aesthetic value and is also an excellent material in terms of structural stiffness.

On the other hand, the manufacturing of carbon fibre fins has a drawback linked to considerable manufacturing costs.

Therefore, the need is felt to reduce the costs associated with the fins, yet maintaining their aesthetic value and the effectiveness of their function in a substantially unchanged or at least comparable manner.

An object of the invention is to meet the above-mentioned need, preferably in a simple and repeatable manner.

DESCRIPTION OF THE INVENTION

The object is achieved by an aerodynamic fin and by a related manufacturing process as defined by the independent claims.

The dependent claims set forth particular embodiments of the invention.

BRIEF DESCRIPTION OF THE DRAWINGS

In order to better understand the invention, an embodiment thereof is described in the following by way of non-limiting example and with reference to the accompanying drawings, wherein:

FIG. 5 represents a cross-section of the fin of FIGS. 3, 4.

EMBODIMENTS OF THE INVENTION

Figure 1:
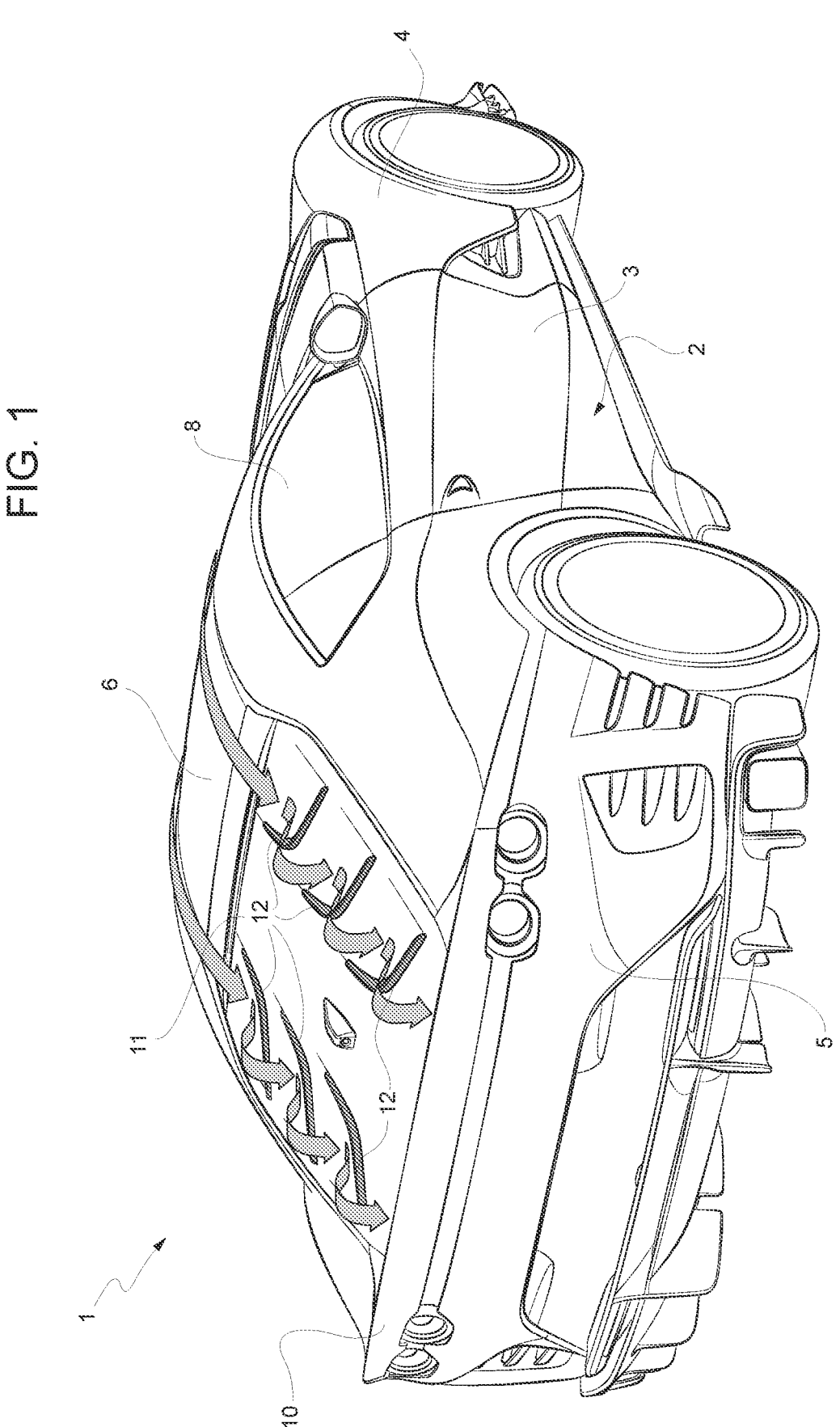
FIG. 1 is a perspective view of a motor vehicle comprising a plurality of fins according to the invention.
Figure 2:
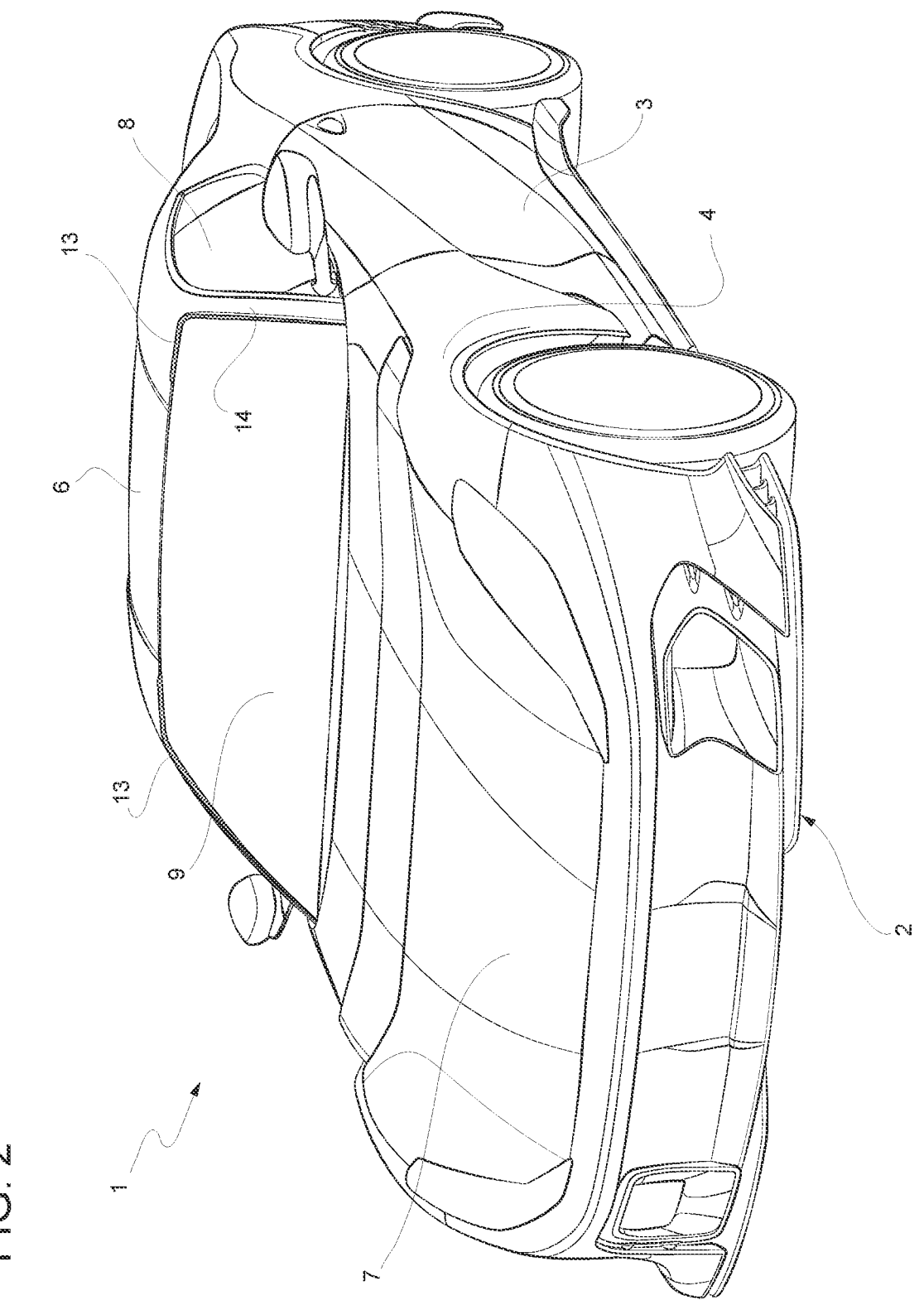
FIG. 2 is a further perspective view of the motor vehicle according to a point of view which is opposite to that of FIG. 1.
Figures 3, 4:
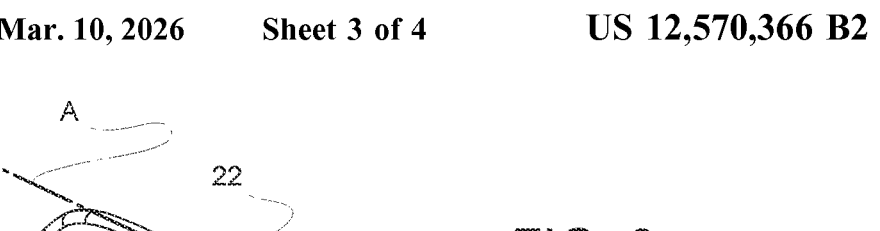
FIGS. 3 and 4 are perspective views of one of the fins according to two respective different points of view.

In FIG. 1, reference numeral 1 is used for indicating, as a whole, a motor vehicle.

As all motor vehicles, the motor vehicle 1 has a normal forward direction.

Therefore, terms such as front and rear are to be understood with reference to the forward direction.

The motor vehicle 1 comprises a body including a frame not illustrated and a bodywork 2 supported by the frame. The latter, in turn, includes a plurality of outer panels of the motor vehicle, such as for example a door 3, a fender 4, a rear bumper 5, a roof 6, a hood 7, and the like.

The motor vehicle 1 further comprises other outer panels of known type, such as a side window 8 and a windscreen 9.

In general, the panels are external since each has at least one outer surface of the motor vehicle 1, i.e. a surface visible by a user from the outside of the motor vehicle 1.

The motor vehicle 1 is in particular a motor vehicle of sports type.

For example, as it often occurs for motor vehicles of sports type, the motor vehicle 1 comprises a rear wing 10 projecting at the back with respect to the bumper 5. The wing 10 is also known as spoiler.

Specifically, in place of a rear window, the motor vehicle 1 has a rear panel 11, in particular opaque or non-transparent, between the roof 6 and the wing 10.

The panel 11 is turned towards the top and towards the rear of the motor vehicle 1; therefore, the panel 11 is inclined downwards with respect to the roof 6.

In particular, the panel 11 forms with the wing 10 a recess with concavity turned upwards.

The outer surface of the panel 11 defines a guiding surface for an airflow caused by the forward movement of the motor vehicle 1. The airflow laps the panel 11 towards the wing 10. Thereby, the panel 11 or its external surface guides the airflow towards the wing 10, which is crossed or lapped by the airflow. The airflow crossing or lapping the wing 10 generates a downforce on the motor vehicle 1.

The motor vehicle 1 comprises a plurality of aerodynamic fins 12 fixed to the panel 11, in particular at the recess.

The aerodynamic fins 12 project with respect to the outer surface of the panel 11 as aerodynamic appendixes, in particular transversal or more precisely perpendicular to the airflow lapping the panel 11.

Each of the fins 12 forms an obstacle to the airflow, which passes over the fin 12 forming vortexes on the opposite side of the fin 12 with respect to the one where the flow meets the fin 12. In fact, a local depression is established at such opposite part due to the airflow passing over the fin 12.

FIG. 1 schematically illustrates by means of arrows the behaviour of the airflow due to the fins 12.

The vortexes at the fins 12 amplify the downforce effect of the wing 10, i.e. produce an additional downforce.

Furthermore, the motor vehicle specifically comprises other fins 13 fixed at the windscreen 9, more precisely at the side ends thereof. In particular, the fins 13 can be directly fixed to pillars 14 which laterally contour the windscreen 9 and/or to the roof 6, which contours the windscreen 9 at the top. Alternatively or additionally, the fins 13 can also be directly fixed to the windscreen 9.

The roof 6 is specifically removable, hence the motor vehicle 1 is of convertible type.

The fins 13 have the function of diverting the airflow caused by the forward movement of the motor vehicle 1, so as to prevent rustling in the passenger compartment of the motor vehicle 1.

The fins 13 have a shape similar to that of the fins 12; in general, each of the features of the fins 12 is independently applicable to the fins 13, hence the latter will not be described in further detail.

The fins 12 are preferably identical to each other and their number could be different from what illustrated in FIG. 1.

In general, each of the features of one of the fins 12 is independently applicable to each one of the other fins 12.

Therefore, the following description will refer to only one fin 12.

The fin 12 is configured to be fixed to the panel 11 and comprises a core 16 and a cover 17.

The core 16 comprises or is formed of a plastic material, specifically thermoplastic, in particular polyurethane.

The core 16 can further comprise additives to increase the stiffness and/or the resistance to stresses, for example glass fibres.

The core 16 has a surface 18 turned towards the panel 11 to allow fixing the fin 12 to the panel 11.

The cover 17 comprises carbon fibre. More precisely, the cover 17 comprises or is defined by a sheet 19 comprising carbon fibre. In particular, the cover 17 is constituted by the sheet 19.

For example, the cover 17 is obtained by baking one or more sheets of carbon fibre arranged inside a mould (not illustrated) in order to create the shape of the cover 17. Specifically, the cover 17 is obtained by baking a single sheet of carbon fibre.

The baking takes place in an autoclave, i.e. an apparatus of a type known for baking structures comprising carbon fibre.

Advantageously, the cover 17 is glued to the core 16 on the opposite side with respect to the surface 18. In other words, the fin 12 comprises one or more glue layers 20 interposed between the cover 17 and the core 16. The layers of glue 20 glue the cover 17 to the core 16 on the opposite side with respect to the surface 18.

However, all this is not strictly necessary; in fact, other fixing means could be considered for fixing the cover 17 to the core 16 in such a way that the cover 17 covers the core 16 on the opposite side with respect to the surface 18.

With the fin 12 fixed to the panel 11, the cover 17 hides the core 16. In other words, the core 16 is out of view of the user looking at the panel 11 from the outside of the motor vehicle 1.

The sheet 19 of the cover 17 extends according to a curved longitudinal profile A, for example coplanar to the panel 11.

In particular, the profile A is concave; more in particular, the profile A comprises two end segments 22, 23 straight along incident lines, as well as a junction 24 between the end segments 22, 23.

In other words, the fin 12 has a boomerang shape, in particular according to the profile A.

Furthermore, the sheet 19 has a section represented in FIG. 5 according to a transversal plane or more precisely orthogonal to the profile A.

The section is in fact a strip extending in turn according to a transversal profile B, which is curved and concave towards the panel 11 or the surface 18.

Preferably, all the sections of the sheet 19 according to planes orthogonal to the profile A are respectively strips that extend according to respective transversal profiles similar to the profile B, in the sense that the transversal profiles are curved and concave towards the panel 11 or the surface 18.

Actually, the transversal profiles can be identical to the profile B or different in the actual specific shape, although in any case curved and concave towards the panel 11.

In general, each of the features of the profile B is independently applicable to the other transversal profiles.

The transversal profiles can be projected entirely on respective straight lines for obtaining corresponding projected straight segments, which are respectively the smallest segments obtainable by projection. Such segments represent the widths of the fin 12.

The largest of the widths is much less than the length of the profile A, more precisely at least one-sixth less than the length of the profile A.

The profile A is transversal with respect to the forward direction of the motor vehicle 1.

The core 16 has a surface 24 facing the sheet 19, i.e. turned towards the sheet 19. The surface 24 is opposite with respect to the surface 18. In other words, the surface 24 is turned towards the opposite side with respect to that towards which the surface 18 is turned.

The glue layers 20 glue the surface 24 to the sheet 19. Specifically, the glue layers 20 are directly in contact with the surface 24. More specifically, the glue layers 20 are also directly in contact with the sheet 19.

The plane including the profile B intersects the surface 24. The outcome of the intersection is a curve 25, which is concave towards the panel 11 as the profile B.

However, the curve 25 is preferably more flattened than the profile B.

In greater detail, the profile B and the curve 25 have respective stationary points or maximum points, specifically in terms of height in the context of the motor vehicle 1, or considering the concavity of the profile B and of the curve 25 towards the surface 18.

As is visible in FIG. 5, the curvature of the profile B is greater than the curvature of the curve 25 at the respective stationary points; this corresponds to the fact that the curve 25 is more flattened around its stationary point than the profile B around its stationary point.

In particular, a line normal to the profile B at its stationary point does not comprise the stationary point of the curve 25; in other words, the radii of curvature of the profile B and of the curve 25 at their respective stationary points are misaligned.

More particularly, a further line normal to the curve 25 at its stationary point forms an acute angle with the previous normal line; the acute angle is turned towards the sheet 19.

Preferably, the acute angle is between 5° and 40°, more preferably between 10° and 25°.

The stationary points are part of corresponding intermediate segments 26, 27 of the profile B and of the curve 25, respectively.

The intermediate segment 26 is between two end segments 28, 29, as well as the intermediate segment 27 is between two end segments 30, 31.

The intermediate segment 26 extends between two end points 32, 33, which are also end points of the end segments 28, 29, respectively.

Furthermore, the intermediate segment 27 extends between two end points 34, 35, which are also end points of the end segments 30, 31, respectively.

Specifically, each of the end points 32, 34 are independently flex points, hence the concavity of the end segments 28, 30 is reciprocal to the concavity of the intermediate segments 26, 27.

The end segment 28 is intended to impact the airflow and therefore has a greater curvature than that of the end segment 29.

In particular, the end segment 29 has a substantially negligible curvature.

Specifically, each of the end points 33, 35 are independently points at which the curvature is zero.

Preferably, the end segment 28 has the same curvature of the end segment 30. Hence, the distance between the curve 25 and the sheet 19 is constant for all points of the end segment 28.

The glue layers 20 include a layer 20 with a constant thickness between the end segment 30 and the sheet 19.

Alternatively or additionally, the end segment 29 has the same curvature of the end segment 31. Hence, the distance between the curve 25 and the sheet 19 is constant for all points of the end section 31.

The glue layers 20 include a further layer 20 with a constant thickness between the end segment 31 and the sheet 19.

The distances of the end points 34, 35 from the sheet 19 are less than any other distance of the points of the intermediate segment 27 from the sheet 19.

In other words, the distance of any point of the curve 25 between the end points 34, 35 from the sheet 19 is greater than the respective distances of the end points 34, 35 from the sheet.

The maximum distance between the sheet 19 and the curve 25 is at the stationary point of the profile B along a line normal to the curve 25 passing through the stationary point of the profile B.

As mentioned above, this maximum distance does not coincide with the length of a segment between the stationary points.

Rather, the term distance is understood herein according to a line normal to the curve 25.

Considering the line normal to the curve 25 passing through the stationary point of the profile B, the stationary point of the curve 25 is arranged between the latter normal line and the end segment 28.

The glue layers 20 are exclusively arranged at the end segments 28, 29. In other words, the fin 12 is devoid of glue layers 20 spread on the intermediate segment 27.

For the fixing to the panel 11, the fin 12 further comprises a plurality of fixing members 40 fixed with respect to the core 16.

For example, the fixing members 40 comprise respective threaded shanks 41 projecting with respect to the surface 18, in particular according to respective straight axes C.

As an alternative to the fixing members 40, the fin 12 could have comprised additional adhesive layers, preferably of a double-sided type, applied to the surface 18. For example, the adhesive layers are particularly suitable for fixing the fins 13 on the windscreen 9.

The fixing members 40 can be fixed to the core 16, for example, because they are co-moulded with the core 16. Co-moulding is a technology known per se which involves the insertion of solid bodies, for example metallic or of other material, inside the mould, for example in which liquid plastic material will be injected.

The fin 12 further comprises a plurality of gaskets 42 respectively applied to the fixing members 40, such that the fixing of the core 16 to the panel 11 is fluid tight.

In other words, the gaskets 42 are coupled to the fixing members 40 and configured to prevent the fluids from crossing the panel 11, thereby entering the passenger compartment of the motor vehicle 1.

Specifically, the gaskets 42 are gasket rings, in particular O-rings, arranged around the threaded shanks 41, i.e. around the axes C.

The gasket rings are fitted onto the threaded shanks 41, so that their inner side surfaces adhere in a fluid tight manner to the threaded shanks 41.

Conveniently, but not necessarily, the fin 12 further comprises a plurality of laces or ropes 43 tying the gaskets 42 to one another, such that the latter are coupled to one another.

More in particular, the fin 12 comprises a lace 43 every other seal 42 next to each other. In other words, each gasket 42 is tied via two laces 43 to the other two closest gaskets 42.

A process for manufacturing the fin 12 firstly comprises at least the steps of baking the cover 17 inside a corresponding mould in an autoclave and injection moulding the core 16.

Preferably, the core 16 is co-moulded with the fixing members 40. In other words, the fixing members 40 are arranged in a mould in order to make the core 16; hence, the core 16 is made by injection into the mould containing the fixing members 40.

At this point, the process can additionally comprise the step of gluing the cover 17 to the core 16.

Before fixing the fin 12 to the panel 11, the gaskets 42 are applied to the fixing members 41.

Based on the foregoing, the advantages of the fin 12 and the process according to the invention are evident.

The plastic material of the core 16 is less valuable than the carbon fibre of the cover 17 from an aesthetic point of view, but the plastic material remains invisible thanks to the cover 17. Therefore, the aesthetic value of the fin 12 is unaltered with respect to the known solutions; in fact, the user perceives only the cover 17 from the outside of the motor vehicle 1, hence the user does not notice any differences between the fin 12 and a corresponding fin entirely formed with carbon fibre sheets.

At the same time, the structural performance of the core 16 is completely comparable with respect to the known fins, hence the use of the core 16 does not entail any drawbacks from a structural point of view.

On the other hand, the cost of the fin 12 is very reduced compared to the cost of the known fins, thanks to the core 16 made of less expensive material.

The glue layers 20 are very effective for fixing the cover 17 to the core 16. In fact, the glue layers 20 have a limited bulk and are easily applicable, without any need to perform any processing of the core 16 or the cover 17.

The particular shape of the section in FIG. 5 is also advantageous; in fact, the removal of the sheet 19 from the core 16 at the intermediate segments 26, 27 prevents the formation of imperfections on the cover 17 during the step of gluing the cover 17 to the core 16.

For this reason, it is also convenient for the glue layers 20 to be located only at the end segments 30, 31.

Finally, it is clear that modifications and variations can be made to the fin 12 or to the process according to the invention, which, however, do not depart from the scope of protection defined by the claims.

In particular, the number and the shape of the described and illustrated components could be different and in particular very freely varied.

Furthermore, each numerical range described is to be interpreted as a plurality of single alternative values.

Each single numerical value within the range is to be considered as specifically described even if not explicitly mentioned.

The invention claimed is:

1. An aerodynamic fin configured to be fixed to an outer panel of a motor vehicle, the fin comprising
a core comprising a plastic material and having a first surface to be turned towards the panel in order to fix the fin to the panel with the first surface facing the panel, wherein the fin has a boomerang-shape,
a cover comprising carbon fiber, and
fixing means, which fix the cover to the core, so that the cover covers the core on the opposite side with respect to the first surface, thereby hiding the core when the fin is fixed to the panel.

2. The fin according to claim 1, wherein the cover comprises a sheet comprising carbon fiber, extending according to a curved longitudinal profile and having a section according to a plane transversal to the longitudinal profile, the section being defined by a strip extending according to a curved transversal profile concave towards the first surface, whereby having a first stationary point.

3. The fin according to claim 2, wherein the core has a second surface opposite the first surface and facing the sheet, and wherein an intersection between said plane and the second surface is a curve concave towards the first surface, thereby having a second stationary point.

4. The fin according to claim 3, wherein a first curvature of the transversal profile at the first stationary point is greater than a second curvature of said curve at the second stationary point.

5. The fin according to claim 3, wherein said curve comprises an intermediate segment including the second stationary point and located between two end segments, the intermediate segment extending between two end points having a first and a second distance from the sheet, respectively, and wherein a distance of any point of the curve between said end points from the sheet is greater than the first distance and the second distance, said curve having a maximum distance from the sheet corresponding to a third distance of the first stationary point from said curve.

6. The fin according to claim 1, wherein the fixing means comprise one or more glue layers between the cover and the core, said one or more glue layers gluing the cover to the core.

7. The fin according to claim 6, when depending on claim 5, wherein said one or more glue layers are exclusively arranged at the end segments.

8. The fin according to claim 1, further comprising a plurality of fixing members, which are fixed relative to the core and are configured to fix the core to the panel, the fixing members comprising respective threaded shanks projecting relative to the first surface.

9. The fin according to claim 8, further comprising
a plurality of gaskets respectively applied to the fixing members in order to allow the core to be fixed to the panel in a fluid tight manner, and
a plurality of laces (43) tying the gaskets to one another.

10. A motor vehicle comprising an outer panel and a fin according to claim 1, wherein the fin is fixed to the outer panel with the cover covering the core so as to hide the core.

11. A process to manufacture a fin according to claim 1, the process comprising the steps of
baking the cover inside a mold in an autoclave, and
injection molding the core.

12. The process according to claim 11, further comprising the step of gluing the cover onto the core.

13. The process according to claim 11 to manufacture the fin according to claim 8, wherein fixing members are co-molded with the core.

14. Assembly comprising an outer panel for a motor vehicle and a fin according to claim 1, wherein the fin is fixed to the outer panel with the cover covering the core so as to hide the core.

15. An aerodynamic fin configured to be fixed to an outer panel of a motor vehicle, the fin comprising
a core comprising a plastic material and having a first surface to be turned towards the panel in order to fix the fin to the panel with the first surface facing the panel, wherein the fin has a boomerang-shape,
a plurality of fixing members, which are fixed relative to the core and are configured to fix the core to the panel,
a cover comprising carbon fiber, and
fixing means, which fix the cover to the core, so that the cover covers the core on the opposite side with respect to the first surface, thereby hiding the core when the boomerang-shaped fin is fixed to the panel.

16. The aerodynamic fin of claim 15, wherein the fixing members comprise respective threaded shanks projecting relative to the first surface.

17. An aerodynamic fin configured to be fixed to an outer panel of a motor vehicle, the fin comprising
a core comprising a plastic material and having a first surface to be turned towards the panel in order to fix the fin to the panel with the first surface facing the panel,
a cover comprising carbon fiber, and
fixing means, which fix the cover to the core, so that the cover covers the core on the opposite side with respect to the first surface, thereby hiding the core when the fin is fixed to the panel,
wherein the cover comprises a sheet comprising carbon fiber, extending according to a curved longitudinal profile and having a section according to a plane transversal to the longitudinal profile, the section being defined by a strip extending according to a curved transversal profile concave towards the first surface, whereby having a first stationary point,
wherein the core has a second surface opposite the first surface and facing the sheet, and wherein an intersection between said plane and the second surface is a curve concave towards the first surface, thereby having a second stationary point, and
wherein a first curvature of the transversal profile at the first stationary point is greater than a second curvature of said curve at the second stationary point.

18. An aerodynamic fin configured to be fixed to an outer panel of a motor vehicle, the fin comprising
a core comprising a plastic material and having a first surface to be turned towards the panel in order to fix the fin to the panel with the first surface facing the panel, a cover comprising carbon fiber, fixing means, which fix the cover to the core, thereby hiding the core when the fin is fixed to the panel, a plurality of fixing members, which are fixed relative to the core and are configured to fix the core to the panel so that the cover covers the core on the opposite side with respect to the first surface.

19. The aerodynamic fin of claim 18, wherein the fixing members comprise respective threaded shanks projecting relative to the first surface.

* * * * *